(12) United States Patent
Liu et al.

(10) Patent No.: US 12,273,597 B2
(45) Date of Patent: Apr. 8, 2025

(54) DISPLAY APPARATUS AND PROCESS METHOD FOR DISPLAY APPARATUS

(71) Applicant: HISENSE VISUAL TECHNOLOGY CO., LTD., Shandong (CN)

(72) Inventors: Dongdong Liu, Shandong (CN); Jie Dong, Shandong (CN); Haibo Zhang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 50 days.

(21) Appl. No.: 18/127,961

(22) Filed: Mar. 29, 2023

(65) Prior Publication Data
US 2023/0239542 A1    Jul. 27, 2023

Related U.S. Application Data

(63) Continuation of application No. PCT/CN2022/096190, filed on May 31, 2022.

(30) Foreign Application Priority Data

Jul. 20, 2021  (CN) .......................... 202110820749.0
Jul. 21, 2021  (CN) .......................... 202110823565.X

(51) Int. Cl.
*H04N 21/485*  (2011.01)
*H04N 21/422*  (2011.01)

(52) U.S. Cl.
CPC ... *H04N 21/4854* (2013.01); *H04N 21/42204* (2013.01)

(58) Field of Classification Search
None
See application file for complete search history.

(56) References Cited

U.S. PATENT DOCUMENTS

| 5,543,857 A | 8/1996 | Wehmeyer et al. |
| 2010/0333029 A1 | 12/2010 | Smith et al. |
| 2021/0195296 A1* | 6/2021 | Aoyagi .................. G09G 5/005 |

FOREIGN PATENT DOCUMENTS

| CN | 1167557 A | 12/1997 |
| CN | 102801936 A | 11/2012 |

(Continued)

OTHER PUBLICATIONS

English translation of Chinese Office Action issued in CN 202110820749.0, mailed Oct. 8, 2022.

(Continued)

*Primary Examiner* — Samira Monshi
(74) *Attorney, Agent, or Firm* — ANOVA LAW GROUP, PLLC

(57) ABSTRACT

Provided are a display apparatus and a process method for the display apparatus. The display apparatus includes a display; a communicator, communicating with the network; a remote controller; a memory; and a processor configured for executing instructions in the memory to cause the display apparatus to perform: obtaining video source information from a target video source currently played by the display, where the video source information includes signal source information and type information; determining picture modes corresponding to the target video source according to the signal source information and the type information; displaying the picture modes corresponding to the target video source in a picture mode list; in response to a selection instruction for selecting a target picture mode, obtaining image adjustment parameters corresponding to the target picture mode; and adjusting image quality of the target video source according to the image adjustment parameters.

18 Claims, 14 Drawing Sheets

(56) References Cited

FOREIGN PATENT DOCUMENTS

| | | |
|---|---|---|
| CN | 103686422 A | 3/2014 |
| CN | 103686423 A | 3/2014 |
| CN | 103686425 A | 3/2014 |
| CN | 103716562 A | 4/2014 |
| CN | 111427643 A | 7/2020 |
| CN | 111984166 A | 11/2020 |
| CN | 112118400 A | 12/2020 |
| CN | 112188249 A | 1/2021 |
| CN | 112214189 A | 1/2021 |
| CN | 112333548 A | 2/2021 |
| CN | 112584211 A | 3/2021 |
| CN | 112887778 A | 6/2021 |
| CN | 113094142 A | 7/2021 |
| CN | 113473241 A | 10/2021 |
| WO | 2007010288 A1 | 1/2007 |

OTHER PUBLICATIONS

English translation of Chinese Office Action issued in Cn 202110823565. X, mailed Feb. 10, 2022.
English translation of International Search Report issued in PCT/CN2022/096190, mailed Aug. 22, 2022.
Non-Final Office Action dated Dec. 18, 2023 for U.S. Appl. No. 18/494,745.

\* cited by examiner

DISPLAY APPARATUS AND PROCESS METHOD FOR DISPLAY APPARATUS

CROSS REFERENCE TO RELATED APPLICATIONS

The present application is a continuation of International Application No. PCT/CN2022/096190, filed on May 31, 2022, which claims the priority to Chinese Patent Application No. 202110820749.0 and filed on Jul. 20, 2021 and Chinese Patent Application No. 202110823565.X and filed on Jul. 21, 2021, which are incorporated herein in their entireties by reference.

FIELD

The present application relates to display apparatuses, in particular to a display apparatus and a process method for the display apparatus.

BACKGROUND

A user interface used in a display apparatus, allows a user to interact with the display apparatus and perform functional configuration and daily operations on the display apparatus. The user interface includes items which can be selected by a user, for example, various controls (such as a progress bar) and menus. For example, a menu of a display apparatus of a TV can include sub-menus of system settings, image quality settings, sound settings, etc., and the sub-menus can include a number of different functional options in turn.

Generally, the user interface can display main menus, sub-menus and their names in the case of displaying some menus. The sub-menu includes functional options displayed in specific names, which are generally presented in a vertical list in the menu. In a main menu interface, the user can operate and switch different sub-menus through a remote controller to display the functional options of the sub-menu on the user interface. For example, in the operation process of switch and selection from a number of functional options in the sub-menu by the user with the remote controller, the functional options displayed in specific names on the user interface will be highlighted as selected, for the convenience of further confirmation of a setting operation by the user.

However, with continuous upgrade of smart TV products configured with a variety of definition and sound quality improvement technologies, the display efficiency of a traditional menu display interface can no longer satisfy complex and professional functional configuration status of TVs. In the case where functional options in the TV menu involve professional parameters and configuration effects, it seems difficult for ordinary users to understand merely based on names of the functional options of the menu, they can only determine the specific function setting effects of the options by repeatedly setting and comparing various functional options, or implement an appropriate operation on the options in the menu through comparison and comprehension with reference to instructions when setting functional options.

SUMMARY

According to an aspect of the present application, a display apparatus is provided and includes a display, configured for presenting one or more images and one or more user interfaces from a broadcast system or network; a communicator, configured for communicating with the network; a remote controller, including a plurality of keys; a memory, configured to store instructions; and a processor, in connection with the display, the communicator and the memory, and configured for executing the instructions to cause the display apparatus to perform: obtaining video source information from a target video source currently played by the display, where the video source information includes signal source information of the target video source and type information of the target video source; determining picture modes corresponding to the target video source according to the signal source information and the type information, wherein target video sources with different signal source information and different type information correspond to different picture modes; displaying the picture modes corresponding to the target video source in a picture mode list; in response to a selection instruction for selecting a target picture mode, obtaining image adjustment parameters corresponding to the target picture mode; and adjusting image quality of the target video source according to the image adjustment parameters.

According to another aspect of the present application, a process method for the above display apparatus is provided. The method includes: obtaining video source information from a target video source currently played by the display, where the video source information includes signal source information of the target video source and type information of the target video source; determining picture modes corresponding to the target video source according to the signal source information and the type information, wherein target video sources with different signal source information and different type information correspond to different picture modes; displaying the picture modes corresponding to the target video source in a picture mode list; in response to a selection instruction for selecting a target picture mode, obtaining image adjustment parameters corresponding to the target picture mode; and adjusting image quality of the target video source according to the image adjustment parameters.

DETAILED DESCRIPTION OF THE EMBODIMENTS

In order to make objectives and embodiments of the present application clearer, exemplary embodiments of the present application will be described clearly and completely below with reference to accompanying drawings in exemplary embodiments of the present application, and apparently, the described exemplary embodiments are merely some embodiments rather than all embodiments of the present application.

It should be noted that brief description of terms in the present application is merely for the convenience of understanding the embodiments described below, and is not intended to limit the embodiments of the present application. Unless otherwise specified, these terms should be understood according to ordinary and plain meanings.

Figure 1:
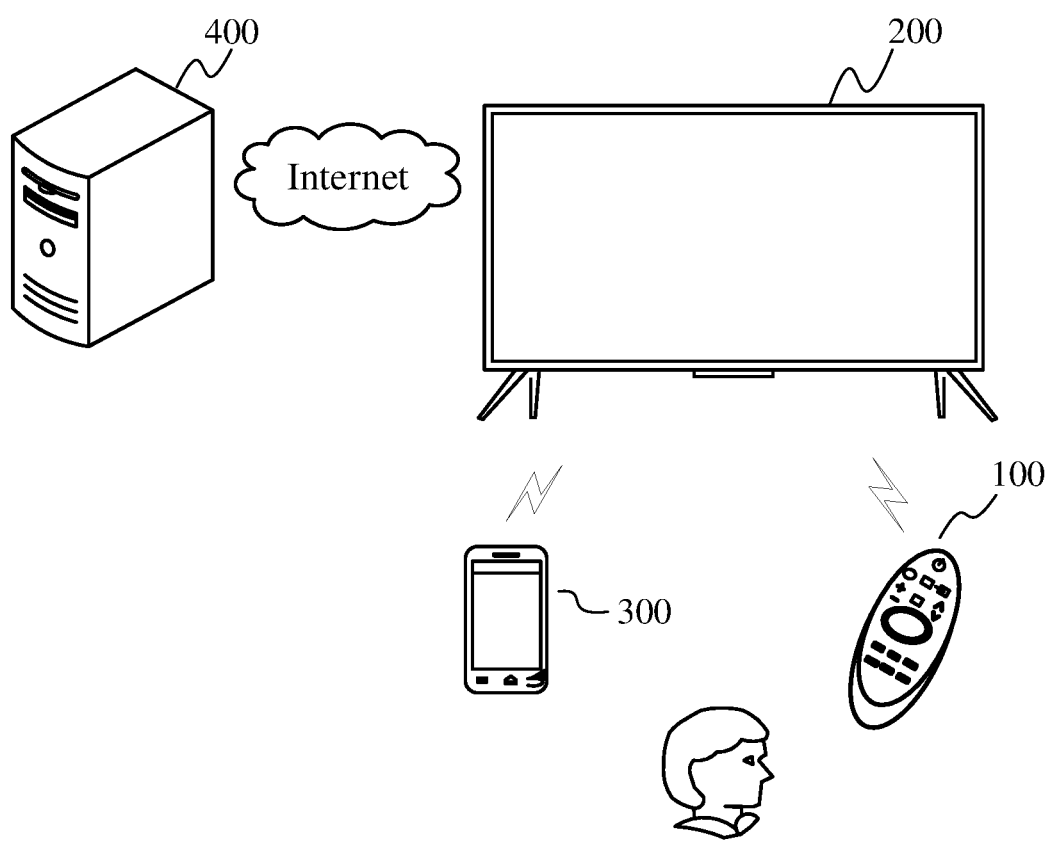
FIG. 1 is an operation scenario of a display apparatus according to some embodiments.

FIG. 1 is a schematic diagram of an operation scenario between a display apparatus and a control device according to the embodiments. As shown in FIG. 1, a user may operate the display apparatus 200 through a smart device 300 or the control device 100.

In some embodiments, the control device 100 may be a remote controller, and communication between the remote controller and the display apparatus includes infrared protocol communication or Bluetooth protocol communication, and other short-distance communication modes, and the display apparatus 200 is controlled in a wireless or wired mode. The user may control the display apparatus 200 by inputting a user command through a key on the remote controller, voice input, control panel input, etc.

In some embodiments, the smart device 300 (such as a mobile terminal, a tablet computer, a computer and a notebook computer) may further be used to control the display apparatus 200. For example, the display apparatus 200 is controlled with an application running on the smart device.

In some embodiments, the display apparatus 200 may further be controlled in a mode besides the control device 100 and the smart device 300, for example, by directly receiving a voice command through a voice acquiring module configured inside the display apparatus 200, or by receiving a voice command through a voice control device configured outside the display apparatus 200.

In some embodiments, the display apparatus 200 performs data communications with a server 400.

Figure 2:
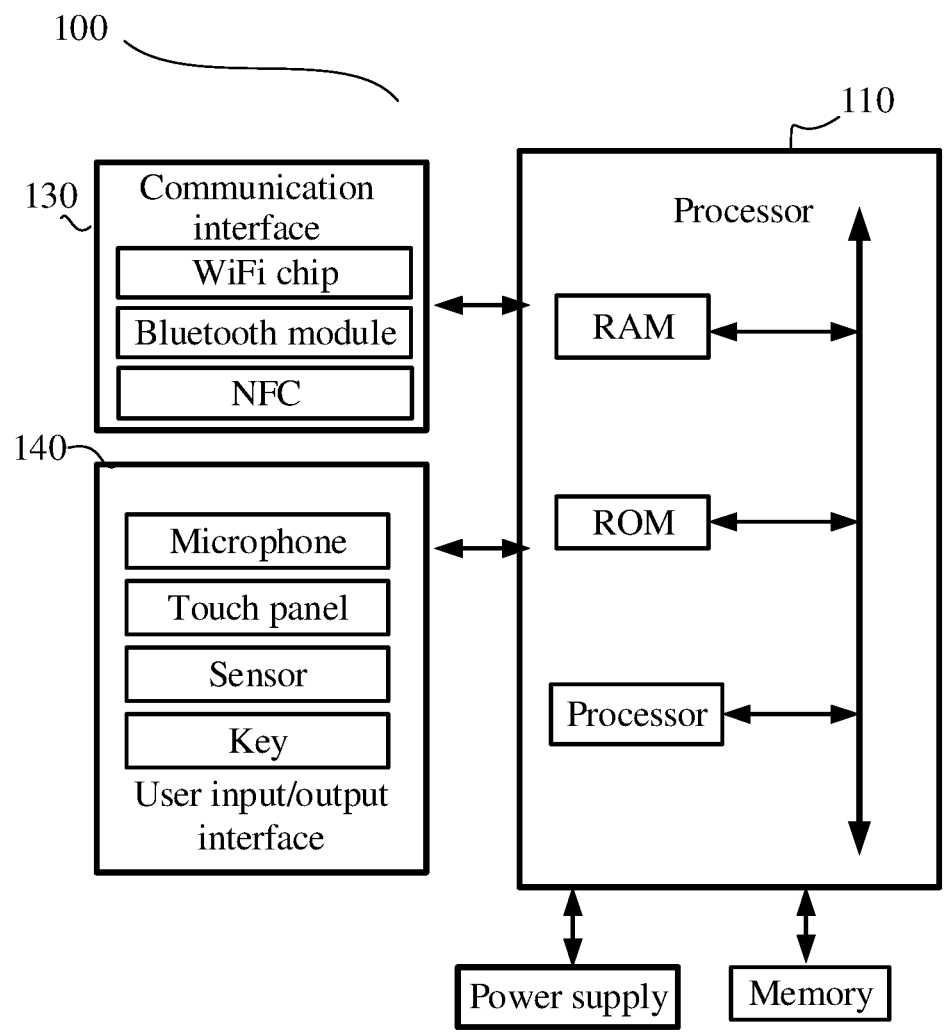
FIG. 2 is a block diagram of hardware configuration of a control device 100 according to some embodiments.

FIG. 2 is a configuration block diagram of a control device 100 according to some embodiments. As shown in FIG. 2, the control device 100 includes a processor 110, a communication interface 130, a user input/output interface 140, a memory and a power supply. The control device 100 may receive an operation command from a user, and convert the operation command into a recognizable instruction to which the display apparatus 200 may respond, so as to play an interactive intermediary role between the user and the display apparatus 200.

In some embodiments, the communication interface 130 is configured to communicate with outside, and the communication interface 130 includes at least one of a WIFI chip, a Bluetooth module, a near-field communication (NFC) or an alternative module.

In some embodiments, the user input/output interface 140 includes at least one of a microphone, a touch panel, a sensor, a key or an alternative module.

Figure 3:
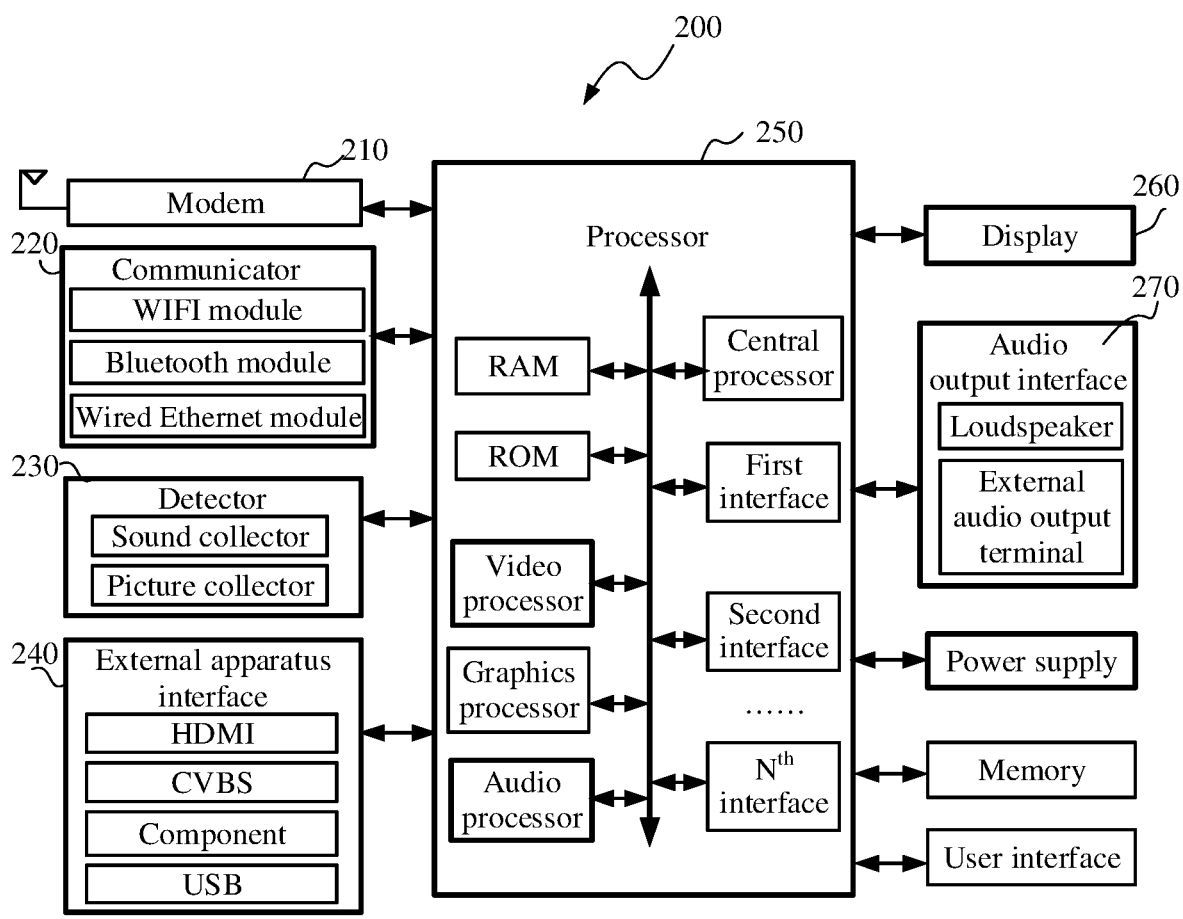
FIG. 3 is a block diagram of hardware configuration of a display apparatus 200 according to some embodiments.

FIG. 3 is a block diagram of hardware configuration of a display apparatus 200 according to some embodiments.

In some embodiments, the display apparatus 200 includes at least one of a modem 210, a communicator 220, a detector 230, an external apparatus interface 240, a processor 250, a display 260, an audio output interface 270, a memory, a power supply, and a user interface.

In some embodiments, the processor 250 includes a processor, a video processor, an audio processor, a graphics processor, a random-access memory (RAM), a read-only memory (ROM), and a first interface to an $n^{th}$ interface for input/output.

In some embodiments, the display 260 includes a panel component for presenting one or more images, and a drive component for driving picture display, a component for receiving one or more image signals output from the processor, displaying video content, picture content and a menu manipulation interface, and a UI for user's operation.

In some embodiments, the display 260 may be a liquid crystal display, an organic light-emitting diode (OLED) display, and a projection display, and may further be a projection device or a projection screen.

In some embodiments, the communicator 220 is a component for communicating with an external device or a server according to various communication protocols. For example, the communicator 220 may include a WiFi module, a Bluetooth module and a wired Ethernet module, as well as an infrared receiver. The display apparatus 200 may establish transmission and reception of a control signal and a data signal with an external control device 100 or the server 400 through the communicator 220.

In some embodiments, the user input interface may be used to receive the control signal from the control device 100 (such as an infrared remote controller).

Figure 4:
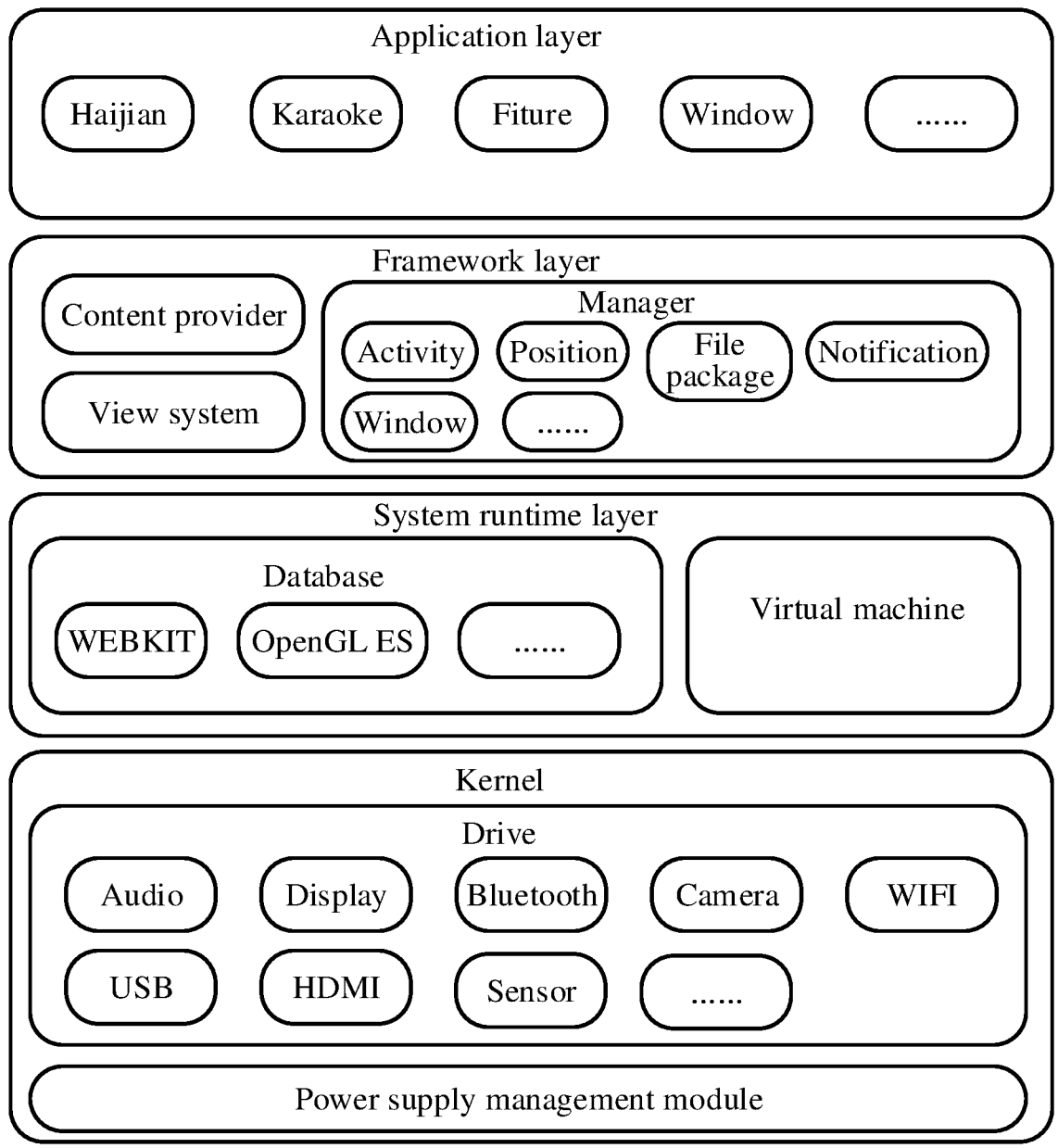
FIG. 4 is a diagram of software configuration of a display apparatus 200 according to some embodiments.

With reference to FIG. 4, in some embodiments, a system is divided into four layers, namely, from top to bottom, an application layer, an application framework layer, an Android runtime and system library layer (system runtime library layer for short), and a kernel layer.

The embodiment of the present application may be applied to various types of display apparatuses (including but not limited to smart TVs, LCD TVs, set-top boxes and other devices). The smart TV will be taken as an example to illustrate the display apparatus and the process method for the display apparatus below.

Figure 5A:
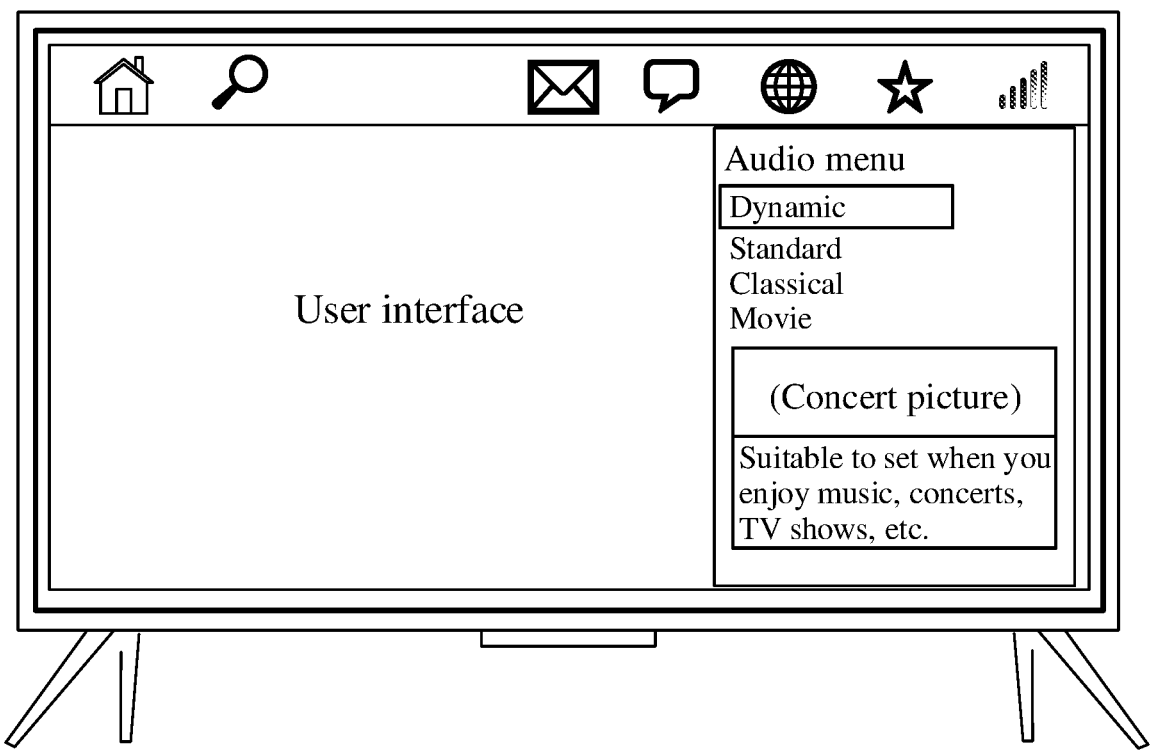
FIG. 5A is a schematic diagram of a user interface with a menu displayed in an image-plus-text style according to an embodiment of the present application.

FIG. 5A is a schematic diagram of a user interface with a menu displayed in an image-plus-text style according to an embodiment of the present application.

In some embodiments, the display apparatus according to the present application includes a display which is configured for displaying one or more images and a user interface. The user interface may display items available for user's selection, for example, various controls (such as progress bars) and menus, so as to control a TV. A user may select and confirm an option of the TV menu through a control device such as a remote controller, so as to configure TV functions.

In the embodiments of the present application, the menu on the user interface may include an image and/or a text, that is, the menu is an image-plus-text style menu.

For example, a picture menu on the smart TV may include a picture effect menu, a picture scale menu, a picture mode menu, etc., and a sound setting menu on the smart TV may include an audio menu, a surround sound menu, etc.

The display apparatus according to the present application may provide menu display through an image, a text, or an image plus text for a user according to a function for a menu setting option in a specific menu setting interface, thereby providing the user with intuitive visual and auditory description of the option.

In the embodiments of the present application, during a display process, image-plus-text prompt information on an image-plus-text style menu may change instantly during focus movement, and automatically adapt to the menu option corresponding to a current focus, such that the user may get brief description and introduction of an option in the image-plus-text-style in real time, the menu in the image-plus-text style is displayed intelligently, and comfortable functional experience is achieved.

In some embodiments, the menu includes a plurality of options. During the display process, when the focus on the user interface lands on the menu item, the processor may control the user interface to display a prompt content corresponding to the item. The prompt content includes an image and/or a text for briefing a function of the item.

In the embodiments of the present application, when the focus is on a current option or item (hereinafter also referred to as "a first option"), the processor will control the first option to present in highlighted form to remind the user that the current option is selected, and the processor will control the user interface to display a first prompt content corresponding to the first option. The first option is used to describe a function configuration effect of the first option, so as to assist the user in deciding whether to confirm the first option.

For example, the audio menu displayed in the user interface in FIG. 5A includes four options, namely, dynamic, standard, classical and movie. The current focus on the TV user interface is located in a dynamic option position, and the user interface displays the corresponding first prompt content that is located in the menu interface below all options, and is specifically displayed as an image and a text paragraph overlaying an upper layer of the image.

It may be found that if there is no prompt content, a specific meaning and a setting effect of the dynamic option in the corresponding audio menu is difficult for ordinary users to understand and set.

Through a concert scene picture in the first prompt content, the user may get an intuitive and visual picture introduction about the dynamic option in the menu, that is, a setting effect may be similar to that of a concert scene. Through a text paragraph "Suitable to set when you enjoy music, concerts, TV shows, etc." displayed on the picture, it may be made clear to the user that when the user listens to and watch live and recorded concerts, or listen to pop music and watch TV dramas, the user may get better listening experience when choosing the dynamic option.

The process method for the display apparatus lowers difficulty for the user to understand functional options, such that the user does not need to set and experience different options one by one, or repeatedly compares differences of corresponding audio effects among different option setting scenarios, thereby allowing the user to quickly select the desired function.

Figure 5B:
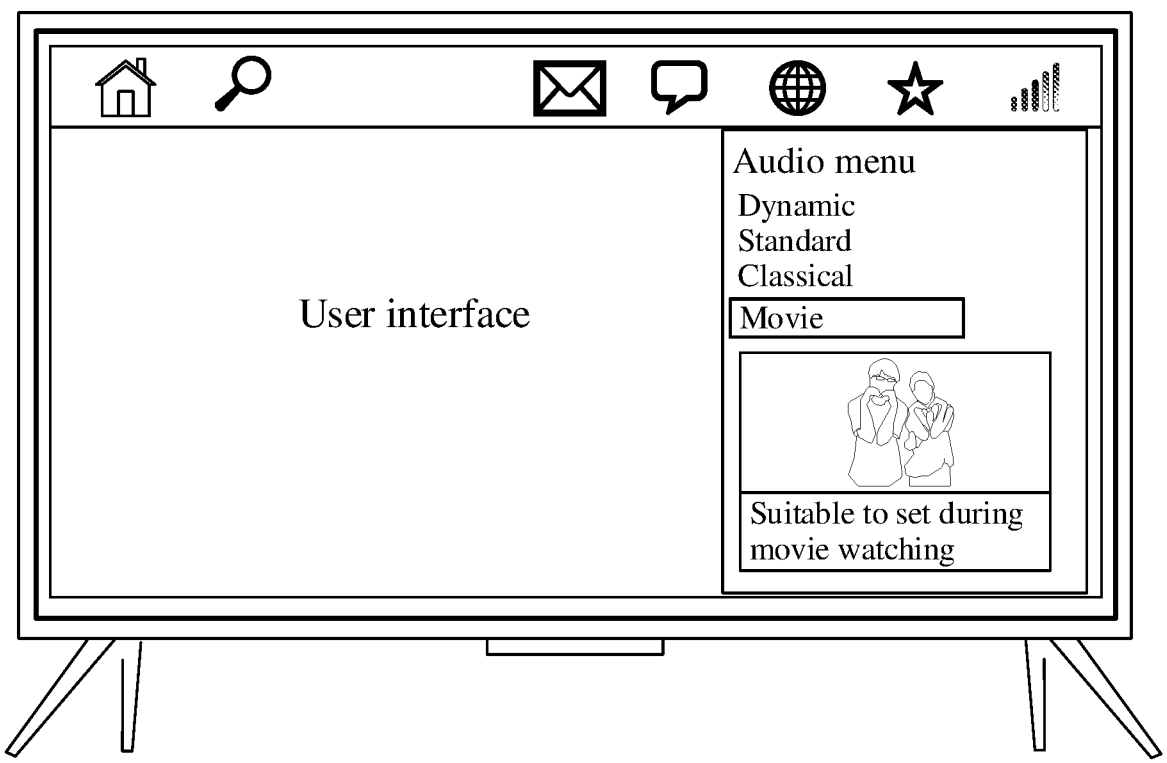
FIG. 5B is a schematic diagram of a user interface with a menu displayed in an image-plus-text style according to another embodiment of the present application.

FIG. 5B is a schematic diagram of a user interface with a menu displayed in an image-plus-text style according to another embodiment of the present application.

In some embodiments, when a focus on the user interface is moved from the first option to a next option (hereinafter also referred to as "a second option"), the processor will control the user interface to display a second prompt content corresponding to the second option.

The second prompt content may include a second image for intuitively and visually introducing a function of the second option, and/or a second text briefly introducing the function of the second option. It may be understood that the second prompt content for the second option may include both image and text at the same time, or merely an image or a text.

For example, based on the operation on the user interface in FIG. 5A, a user moves a focus from a dynamic option to a movie option, and a prompt content below an audio menu on the user interface changes instantly, from a previous dynamic description in image-plus-text form to a movie description in image-plus-text form It may be found that in the case of the movie option in the audio menu, a corresponding second prompt content obviously changes relative to the first prompt content, and the second image is specifically implemented as an image in this embodiment, such that the user may be provided with a clear functional effect through a movie scenario shown in the image. The second text is displayed as "Suitable to set during movie watching", so as to prompt the user clearly in words that an audio effect represented by the movie option is suitable for a video source of a movie or with grand scenarios.

In the embodiments of the present application, the menu is displayed in an image-plus-text style, and the description text and image corresponding to the option in the menu are presented, thus enriching the content of the menu, allowing the user to quickly select the desired function, and providing better view experience.

In some embodiments, when the focus on the user interface is moved from the first option to the second option in the menu, the processor will draw a specific prompt area on the user interface, and during the option switch process, the processor will control the prompt area to switch from first prompt content display to second prompt content display. It should be noted that the prompt area and the option of the menu are kept in relatively fixed positions.

For example, in the process of changing the user interface from FIG. 5A to FIG. 5B, the first prompt content and the second prompt content are displayed in the similar position on the user interface, that is, the processor displays the corresponding prompt content in a fixed prompt area in real time according to different menu options.

By setting the prompt area, the prompt content may be displayed in a fixed position, such that display regularity and neatness on a user interface may be improved.

In some embodiments, in the case where the second prompt content displayed on the user interface includes the second image and the second text, the processor controls the second text to be displayed covering a lower edge of the second image, that is, in this embodiment, the text paragraph is displayed in the second image and within a display range of the image. The text paragraph may be configured with different transparencies to display different combination effects, as shown in FIGS. 5A and 5B.

In some embodiments, in the case where the second prompt content displayed on the user interface includes the second image and the second text, the processor may further control the second text to be displayed at a periphery of the second image, such as a lower side, a right side, a left side or an upper side of the image, so as to display different combination effects.

In some embodiments, in the case where the second prompt content displayed on the user interface may include the second image and the second text, the processor controls the second text and the second image to be displayed in a list in the menu of the user interface.

For example, in the audio menu in FIG. 5B, four options and the second prompt content are displayed in a list along a vertical direction to meet a usual viewing habit of the user.

In some embodiments, the second image contained in the second prompt content may be implemented as an image, an animation, a short video, an audio, etc. Through multimedia, functions and effects for the second option of the menu may be introduced more intuitively and visually.

Figure 5C:
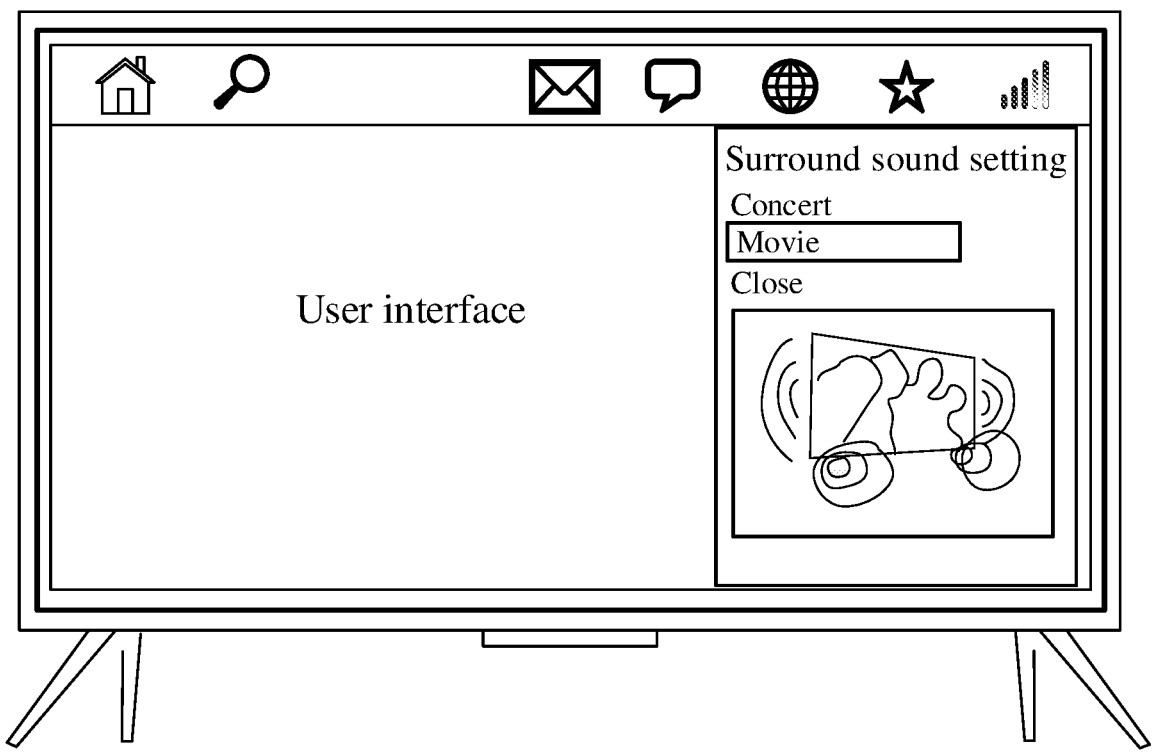
FIG. 5C is a schematic diagram of a user interface with a menu displayed in an image-plus-text style according to another embodiment of the present application.

FIG. 5C is a schematic diagram of a user interface with a menu displayed in an image-plus-text style according to another embodiment of the present application.

In some embodiments, when a focus on a menu of the user interface is moved from a first option to a second option, a second prompt content may merely include a second image for intuitively and visually introducing a function of the second option, wherein the focus can be moved via a key on a remote controller or a voice command For example, a surround sound effect setting menu shown in FIG. 5C includes a concert option, a movie option and an off option. In the case where a current focus is on the movie option, a corresponding prompt content displayed in the current user interface is an effect introduction. It may be found from an image that compared with a TV without a surround sound effect, a prompt content picture displays a plurality of sound symbols, including sound emission towards a left side and a right side of the TV and sound emission towards a front side of a TV panel. Based on the current prompt content, a user will understand intuitively and visually that after the movie option is selected, the surround sound effect of the TV will be increased by 4 sound channels.

Figure 5D:
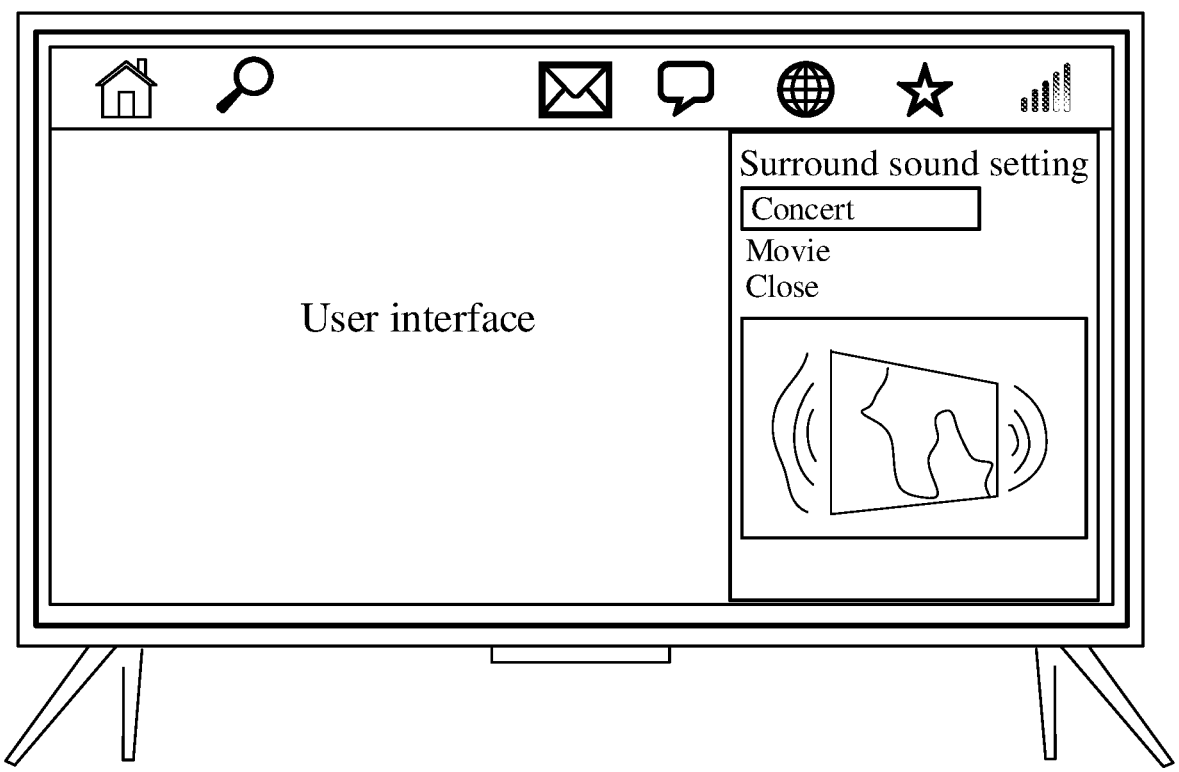
FIG. 5D is a schematic diagram of a user interface with a menu displayed in an image-plus-text style according to another embodiment of the present application.

In some embodiments, based on the operation on the user interface in FIG. 5C, the focus is switched from the movie option to the concert option, and the second prompt content on the user interface is instantly displayed as shown in FIG. 5D. In the concert sound effect setting, as intuitively and visually indicated by the picture, two sound channels are reduced compared with the movie option, and the user may get a difference between the concert sound effect and the movie surround sound effect configuration very intuitively and visually through this picture-plus-text-style menu.

Figure 5E:
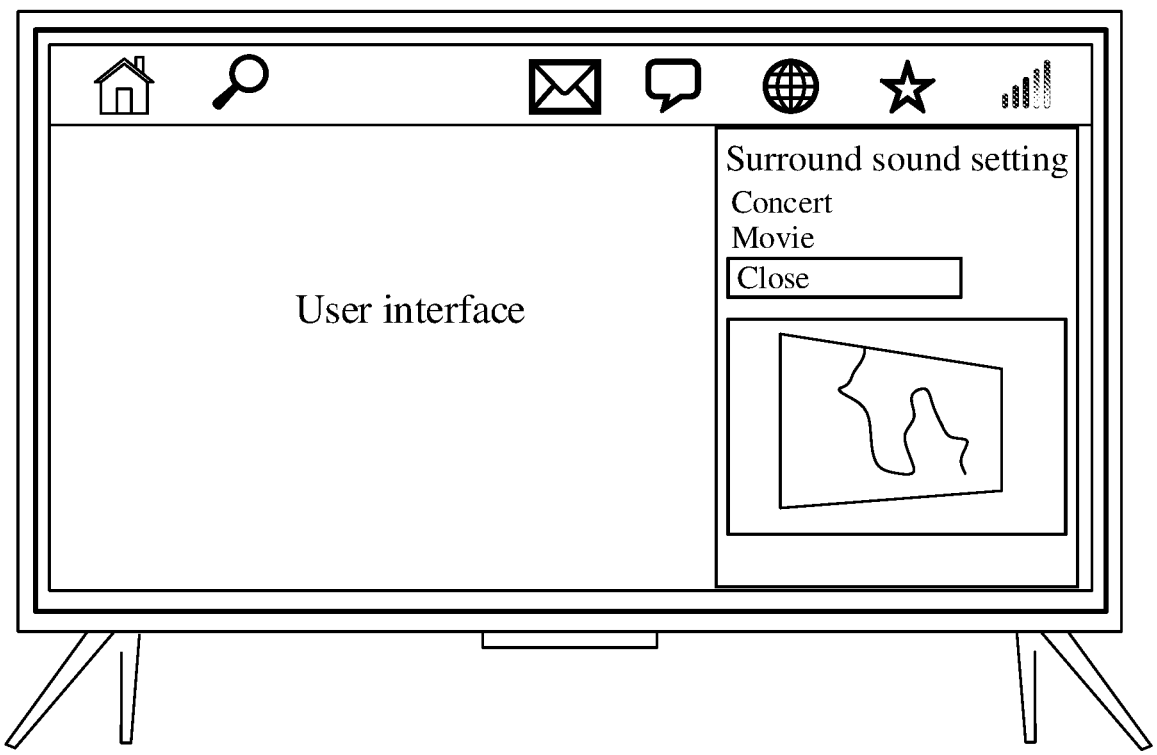
FIG. 5E is a schematic diagram of a user interface with a menu displayed in an image-plus-text style according to another embodiment of the present application.

In some embodiments, based on the operation on the user interface in FIG. 5D, the focus is switched from the concert option to the off option, and the second prompt content of the user interface is instantly displayed as shown in FIG. 5E. After the off option is selected, the prompt content displayed in the user interface is further reduced by 2 sound channels compared with the image of the concert option, and it may be understood that the TV will not show the surround sound effect in the off mode.

According to the embodiments of the present application, the user may achieve intuitive comparison of functional effects of the plurality of options in the menu by displaying the image-plus-text style menu above, thereby improving accuracy and convenience of an operation during human-computer interaction.

Figure 5F:
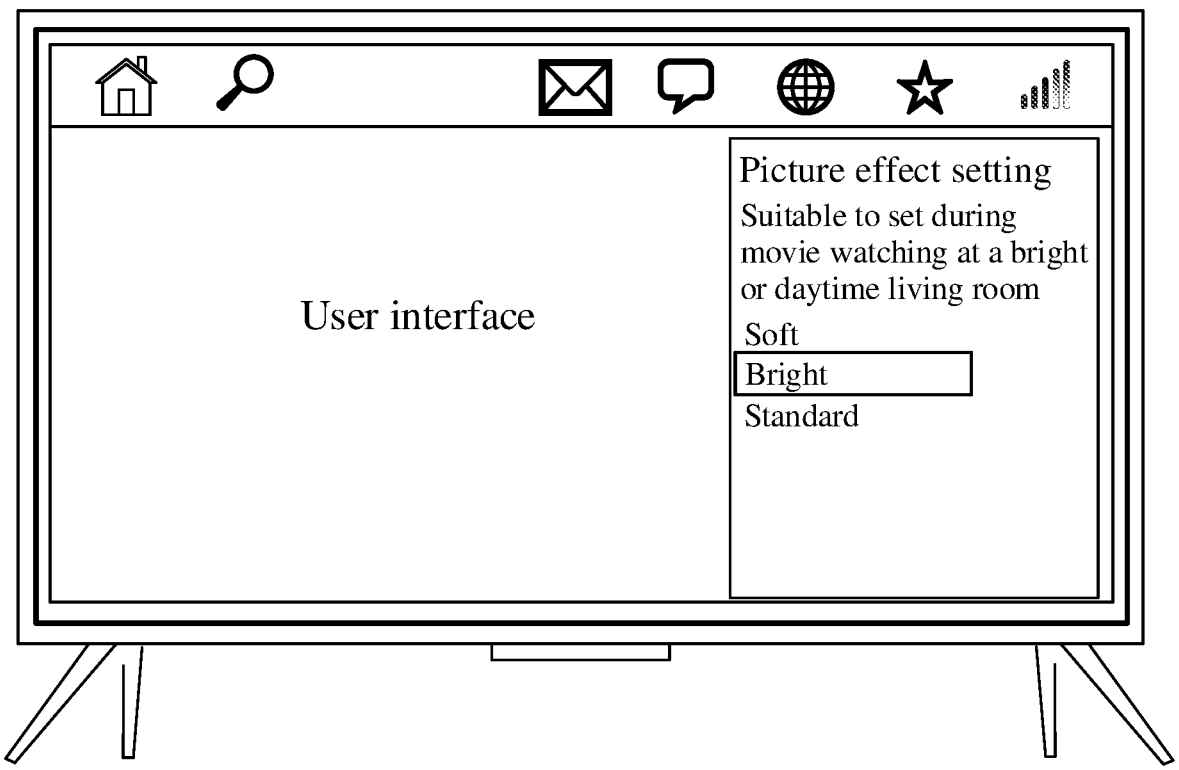
FIG. 5F is a schematic diagram of a user interface with a menu displayed in an image-plus-text style according to another embodiment of the present application.

FIG. 5F is a schematic diagram of a user interface with a menu displayed in an image-plus-text style according to another embodiment of the present application.

In some embodiments, the user interface displays a second prompt content for a second option, and in the case where the second prompt content merely includes a second text, a processor controls the second text on the user interface to be displayed between a menu name and the option.

In some embodiments, the processor may further cause the second option to be displayed in highlighted form on the user interface, and cause the menu name have a larger font than that of the option and the second text, so as to allows for rapid recognition of a prompt content for the option from multi-line texts.

For example, on a user interface, the user may enter a picture effect setting menu through general setting, picture setting and vision effect setting. When a focus is on bright item, a prompt content text "suitable to set during movie watching at a bright or daytime living room" will be displayed below the menu name, so as to allow the user to rapidly and accurately obtain a functional effect for the option and an option configuration scenario in an explicit manner.

It may be understood that below a title of a picture effect setting page, a specific meaning of the picture effect for the option is presented to the user in the form of the text, so as to facilitate understanding by the user. After the focus is moved, corresponding text information changes in real time, such that the option prompt information changes with the focus in real time, ensuring instantaneity and reliability.

In some embodiments, picture setting and sound setting are the most common menu setting options for a smart TV, and mainly provide the user with the most intuitive visual and auditory effect parameter adjustment settings, greatly affecting user experience. The process method for the image-plus-text style menu according to the present disclosure may provide the user with three menu process methods in picture only style, text only style and picture-plus-text style according to a function of a setting menu in a setting interface of a specific function.

Display prompt description information of the picture-plus-text style menu may change during focus move, and automatically adapt to the option corresponding to a current focus, such that the user may get brief description in a picture-plus-text style for a current option in real time, the menu in the picture and text style is displayed intelligently, and comfortable functional experience is realized.

In some embodiments, the process method for the picture-plus-text style menu may display related function menus in picture only style, text only style and picture and text style. When the user enters the setting page, the smart TV may automatically change a display style of the setting menu according to a current scenario, and show, to the user, specific functional features of an option, where the focus is on, in the current menu in the style of picture plus text, so as to allow for convenient selection of the user.

After one move of the focus, information related to the picture-plus-text style menu may be updated in real time, such that the user may conveniently obtain current menu information in real time and accurately, and select an optimal parameter option. The user is provided with an intelligent, rapid and convenient and instant picture and text-style menu display.

In the embodiments of the present application, a display apparatus is further provided to implement a picture mode function selected for a menu.

For example, with the increasing demand of the user for resource quality, professional parameter setting functions such as source picture and sound are provided for the user on the display apparatus 200. For example, where the user needs to adjust image quality of the resource, the display apparatus 200 may provide a plurality of picture modes for the user, and different picture modes correspond to different quality parameters.

Figure 6:
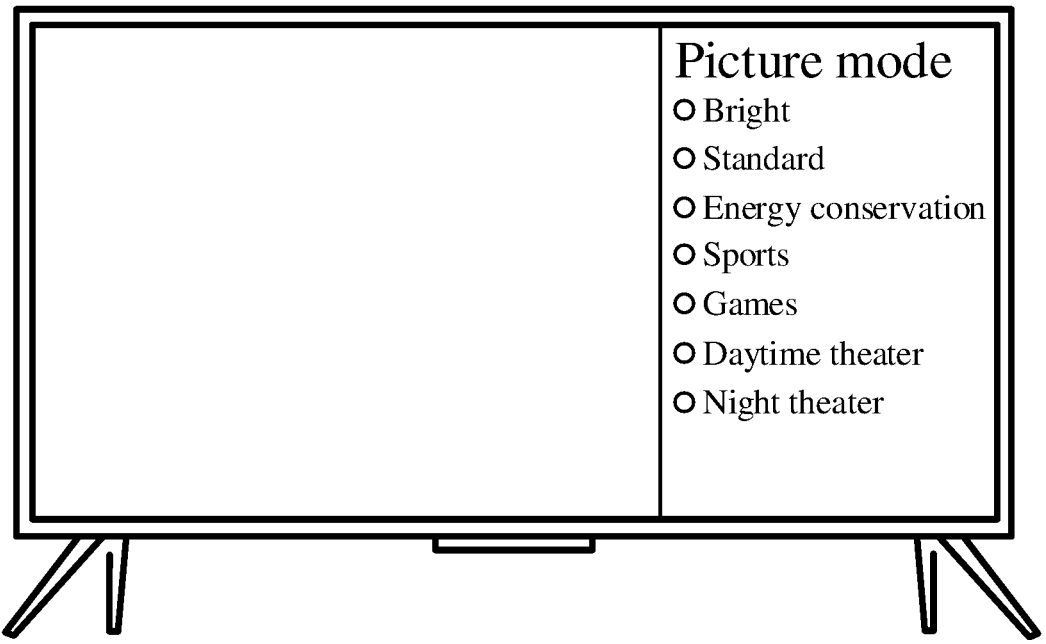
FIG. 6 is a schematic diagram of a picture mode page having a fixed picture mode according to an embodiment of the present application.

FIG. 6 is a schematic diagram of a picture mode page with a fixed picture mode according to an embodiment of the present application. As shown in FIG. 6, the picture mode page merely has bright, standard, energy conservation, games, sports, daytime theater mode, night theater mode and other picture mode adjustments that are suitable for all resources. That is, when a user watches a media resource and needs to adjust a mode of the media resource, the display apparatus 200 may display a picture mode page as shown in FIG. 6. If some media resource has special display requirements or the user has special display requirements for some media resource, there may be a situation where the fixed picture modes currently configured may not satisfy display requirements of this particular resource, causing poor viewing experience of the user. The display apparatus 200 may display all the picture modes on a picture mode page, though which the user may select a desired mode on the page.

However, on the display apparatus 200 shown in FIG. 6, a general picture mode page is configured for all resources, and parameter values corresponding to the picture modes on the picture mode page are fixed. If some resource has special display requirements or the user has special display requirements for some resource, some fixed picture modes currently configured may not satisfy display requirements of a particular resource, thus affecting viewing experience of the user.

In the embodiments of the present application, a display apparatus 200 is further provided, and may provide and show different picture modes for different signal sources and different types of video sources, instead of adaptation to all the video sources with one or several fixed picture modes, thereby making sure that the video picture display quality of the video sources may satisfy the viewing requirements better.

The display apparatus 200 according to the embodiments of the present application needs to configure respective picture modes for video sources from different signal sources and different types at first. For example, video sources of a Dolby type from different signal sources may all have a Dolby vision IQ mode, a Dolby vision dark mode, a Dolby vision customization mode, etc. Video sources of a high-dynamic range (HDR) type from different signal sources may all have an HDR bright mode, an HDR standard mode, an HDR theater mode, etc. Video sources of a standard dynamic range (SDR) type from network applications and HDMI signal sources may all have a bright mode, a standard mode, an energy conservation mode, a sports mode, a daytime theater mode, a night theater mode, etc. Moreover, different picture modes may have respective image quality parameters.

After various alternative picture modes are configured, the display apparatus 200 may play a content of a target video source according to selection by the user. When the user needs to change the picture mode of the target video source, the user may input an instruction for displaying picture mode for the display apparatus 200. After receiving the instruction, the display apparatus 200 may determine all picture modes for the target video source from the configured picture modes available for this type of video source. Then, these picture modes are displayed in the picture mode list for selection by the user. After the user selects a target picture mode, the display apparatus 200 may adjust image quality of the target video source according to the image quality parameters corresponding to the target image, so as to satisfy selected viewing requirements.

Figure 7:
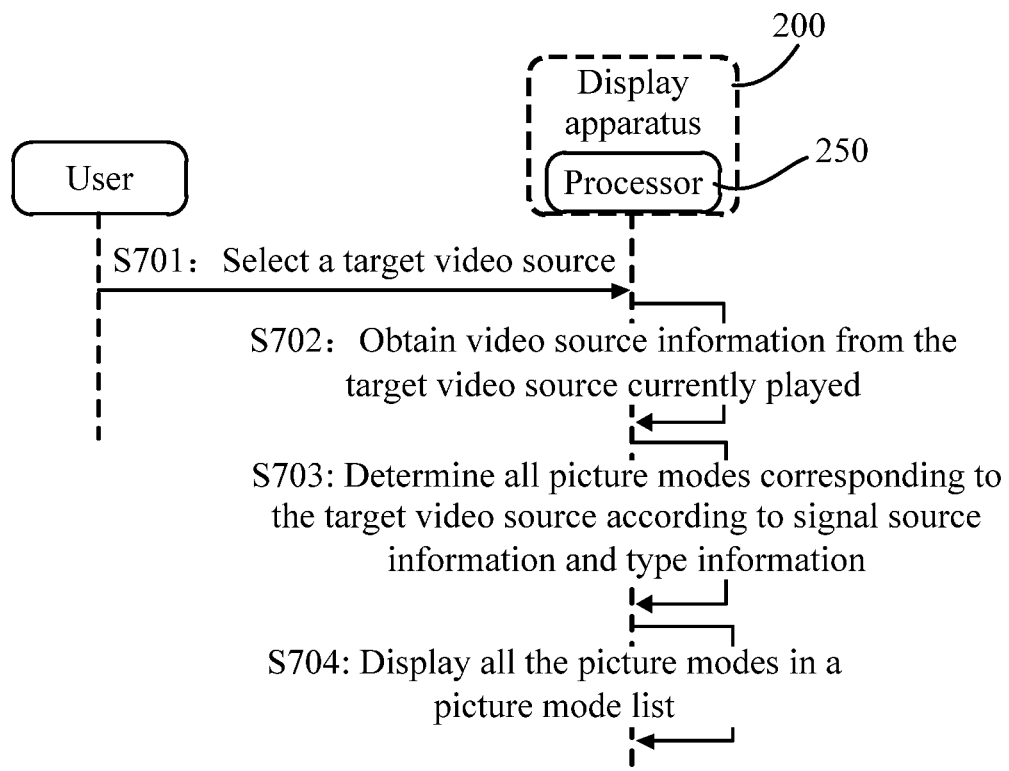
FIG. 7 is a flowchart of displaying a picture mode on a display apparatus 200 according to some embodiments.

With reference to FIG. 7, FIG. 7 is a flowchart of displaying a picture mode by a display apparatus 200 according to some embodiments. In the display apparatus 200, a processing of the display apparatus 200 can be specifically executed by the processor 250. When displaying a picture mode, the processor 250 may be configured to select a target video source (S701): obtain video source information from a target video source currently played by the display apparatus 200 (S702), where the video source information includes signal source information of the target video source and type information of the target video source; determine all picture modes corresponding to the target video source according to signal source information and type information (S703); and display all the picture modes in a picture mode list (S704). Target video sources with different signal source information and different type information correspond to different picture modes.

Figure 8:
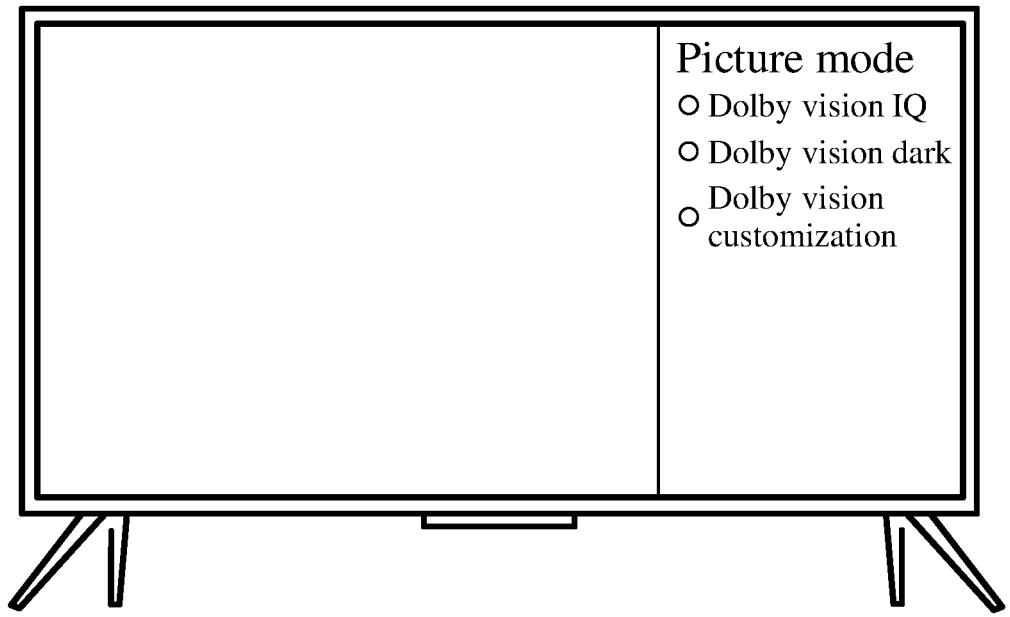
FIG. 8 is a schematic diagram of a picture mode list corresponding to a video source of a Dolby type according to some embodiments.

For example, in a case where the video source information of the target video source being played by the display apparatus 200 is a Dolby type, upon receiving an instruction for displaying picture mode from a user, the display apparatus 200 may obtain a Dolby vision IQ mode, a Dolby view dark mode and a Dolby vision customization mode corresponding to the video source of the Dolby type, and display these modes in the picture mode list. With reference to FIG. 8, a schematic diagram of a picture mode list corresponding to a video source of a Dolby type is shown according to some embodiments in FIG. 8.

Figure 9:
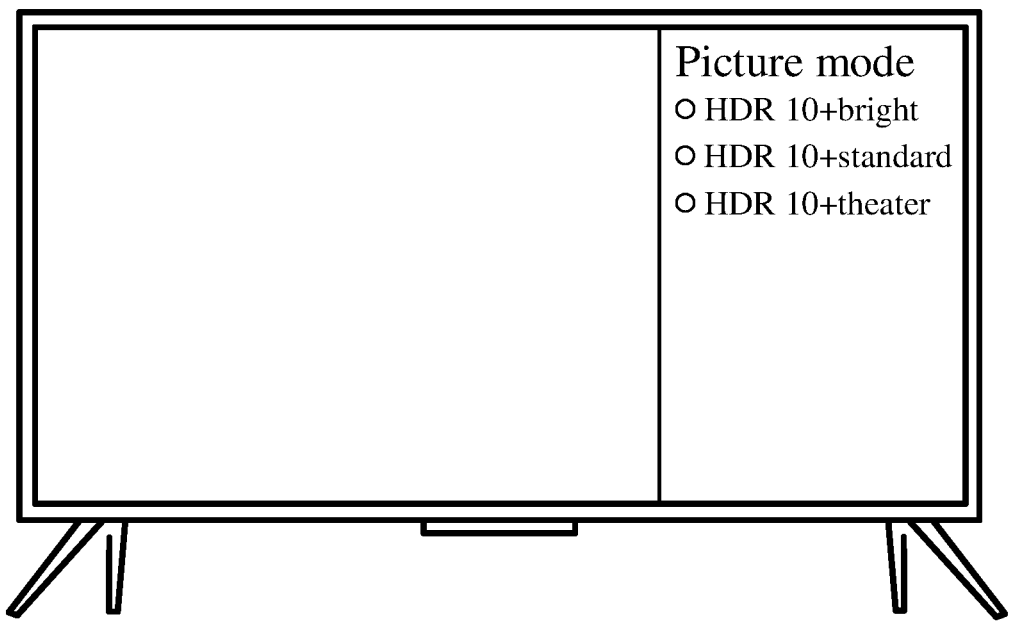
FIG. 9 is a schematic diagram of a picture mode list corresponding to a video source of a high dynamic range (HDR) 10+type according to some embodiments.

If the video source information of the target video source being played by the display apparatus 200 is a high dynamic range (HDR) 10+type, upon receiving an instruction for displaying picture mode from the user, the display apparatus 200 may obtain an HDR 10+bright mode, an HDR 10+standard mode, an HDR 10+theater mode, etc., and display these modes in the picture mode list. With reference to FIG. 9, a schematic diagram of a picture mode list corresponding to a video source of an HDR 10+type is shown.

Figure 10:
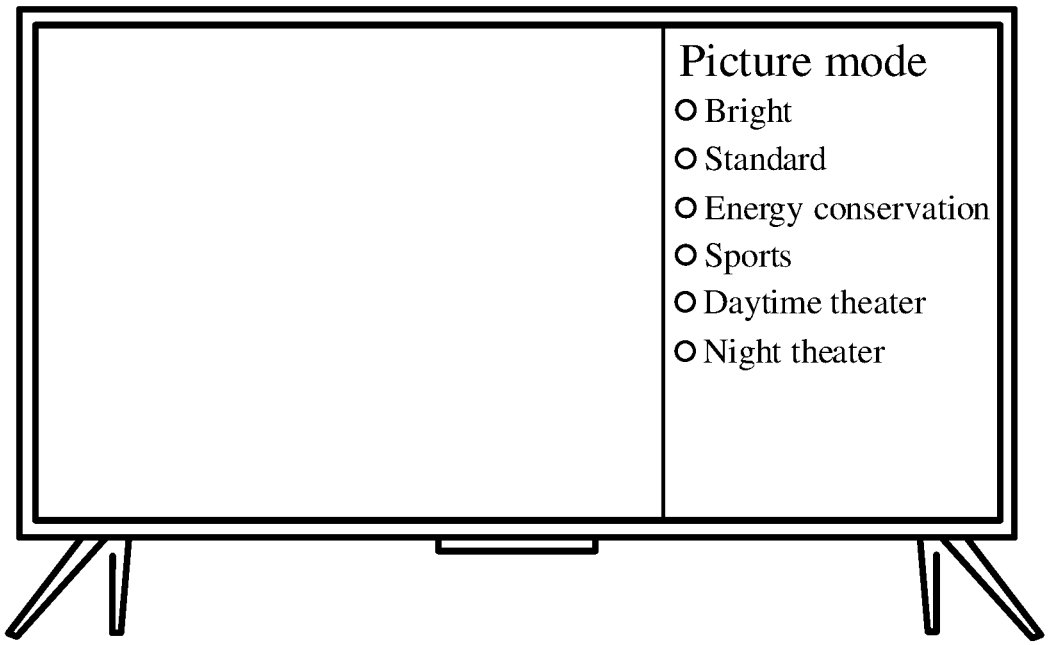
FIG. 10 is a schematic diagram of a picture mode list corresponding to a video source of a standard dynamic range (SDR) type provided by a network application according to some embodiments.

If the video source information of the target video source being played by the display apparatus 200 includes a network application signal source and an SDR type, upon receiving an instruction for displaying picture mode from the user, the display apparatus 200 may obtain a bright mode, a standard mode, an energy conservation mode, a sport mode, a daytime theater mode, a night theater, etc., and display these modes in the picture mode list. With reference to FIG. 10, a schematic diagram of a picture mode list corresponding to a video source of an SDR type provided by a network application signal source is shown.

Figure 11:
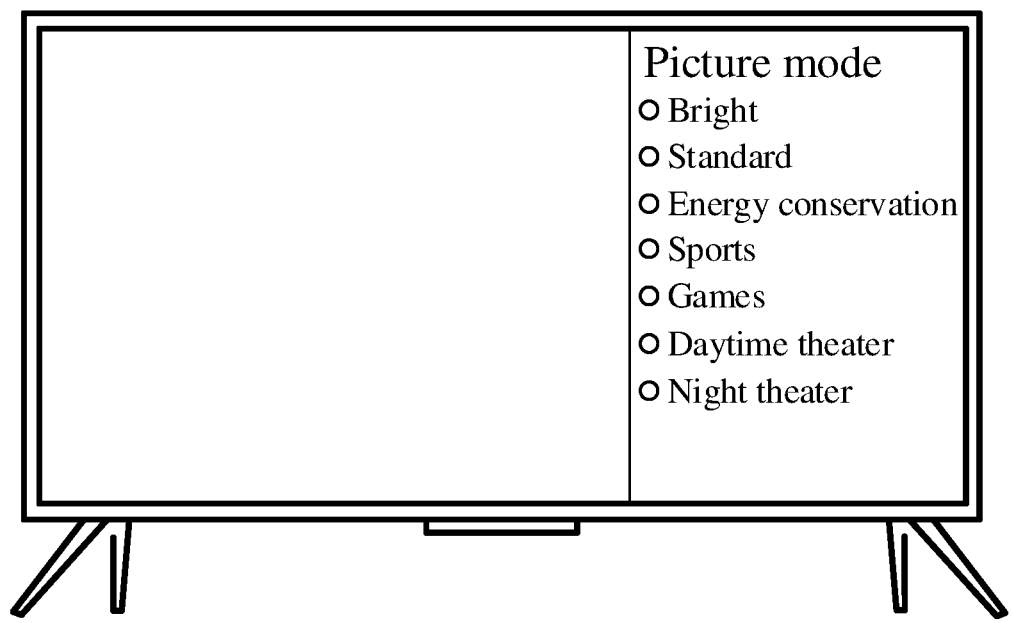
FIG. 11 is a schematic diagram of a picture mode list corresponding to a video source of an SDR type provided by HDMI source according to some embodiments.

If the video source information of the target video source being played by the display apparatus 200 includes an HDMI signal source and SDR type, upon receiving an instruction for displaying picture mode from a user, the display apparatus 200 may obtain a bright mode, a standard mode, an energy conservation mode, a game mode, a sport mode, a daytime theater mode, a night theater mode, etc., and display these modes in the picture mode list. With reference to FIG. 11, a schematic diagram of a picture mode list corresponding to a video source of an SDR type provided by an HDMI signal source is shown, wherein the picture mode list comprises the picture modes determined above.

Figure 12:
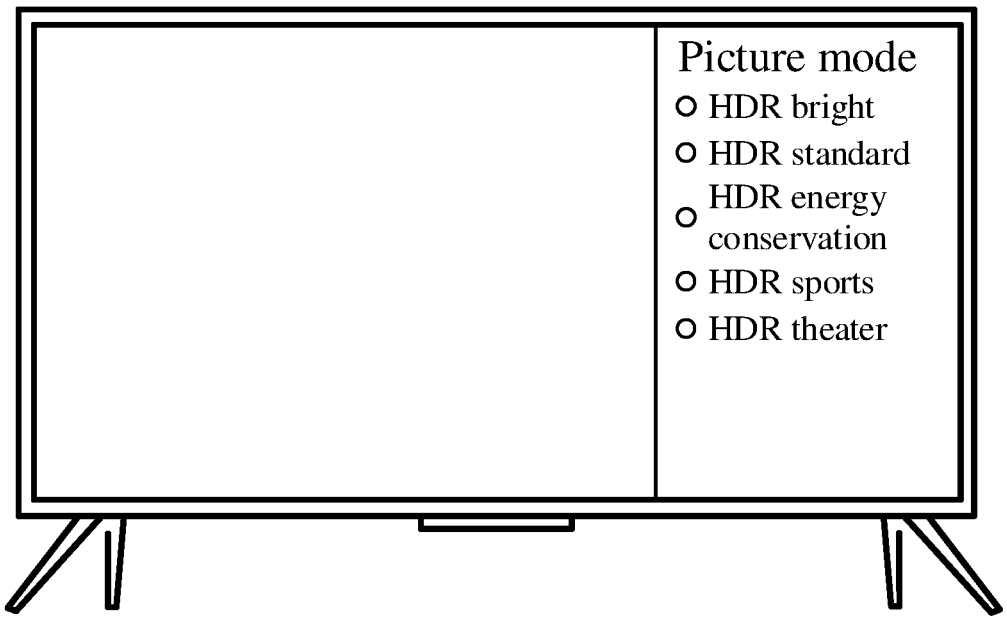
FIG. 12 is a schematic diagram of a picture mode list corresponding to a video source of an HDR type according to some embodiments.

If the video source information of the target video source being played by the display apparatus 200 is an HDR type, upon receiving an instruction for displaying picture mode from the user, the display apparatus 200 may obtain an HDR bright mode, an HDR standard mode, an HDR energy conservation mode, an HDR sport mode, an HDR theater mode, etc., and display these modes in the picture mode list. With reference to FIG. 12, a schematic diagram of a picture mode list corresponding to a video source of an HDR type is shown.

The user may select a target picture mode from the picture mode list by operating direction keys on the control device 100 such as a remote controller. The focus may be controlled to move among items of the picture mode list by pressing the direction keys. When the focus is on a target picture mode, the user may press a confirmation key again to input a selection instruction for selecting the target picture mode.

Alternatively, the user may also select the target picture mode by inputting a voice command, such as uttering "bright" and "standard", to the display apparatus 200 via a voice control function, and then inputting a selection instruction.

After the user selects the target picture mode, the processor 250 of the display apparatus 200 may be configured to obtain image adjustment parameters corresponding to a target picture mode in response to a selection instruction for selecting the target picture mode from the picture mode list from a user; and adjust image quality of the target video source according to the image adjustment parameters.

It may be seen that the display apparatus 200 in the embodiments of the present application may provide different picture modes for different signal sources and different types of target video sources, and is not necessary to provide the same or several fixed picture modes for all video sources. In this way, various picture modes on the display apparatus 200 may be more flexibly adapted to display requirements for different video sources or viewing requirements from the user, thereby improving displaying effects.

In some embodiments, the picture mode list in the display apparatus 200 exists in a subpage of the setting page, and the user may not directly display the picture mode list through one input operation, but needs to control the display apparatus 200 to display the setting page at first, and then select a corresponding option on the setting page to display the picture mode list step by step. An operation for selecting an option by the user each time may be regarded as an input of a different selection instruction to the display apparatus 200.

Figure 13:
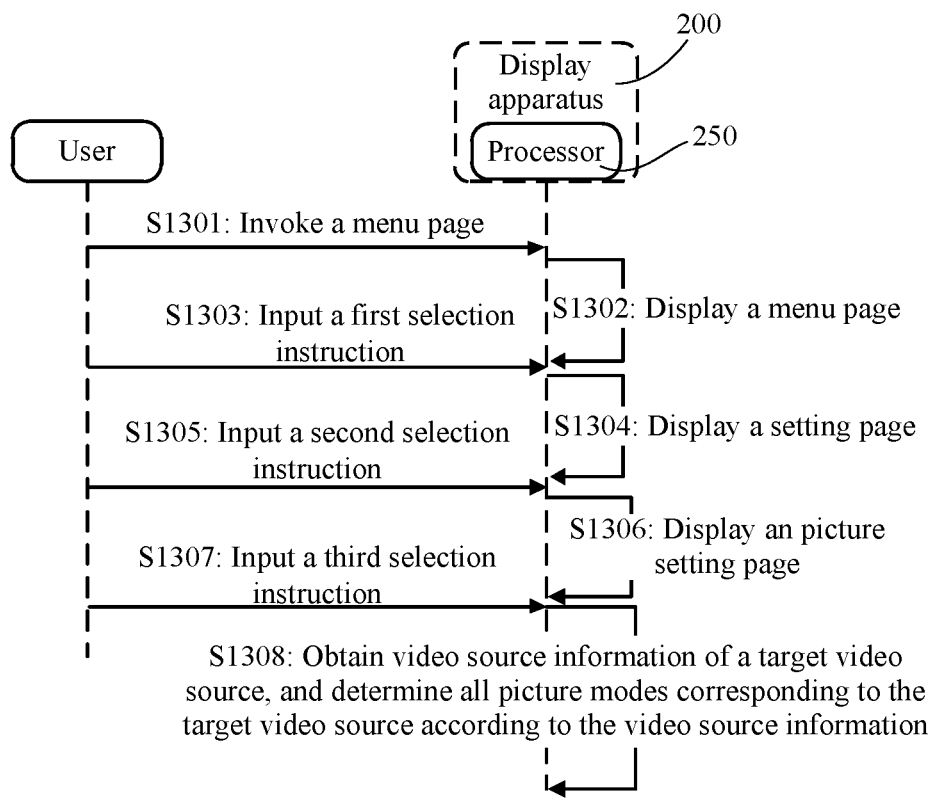
FIG. 13 is a flowchart of obtaining video source information by a display apparatus 200 according to some embodiments.

With reference to FIG. 13, a flowchart of obtaining video source information by a display apparatus 200 is shown. In the embodiments of the present application, the processing of the display apparatus 200 can be specifically performed by the processor 250.

While the display apparatus 200 is playing a target video source, the user may invoke a menu page, etc. with a setting option for a display content of a current target video source (S1301) and the display apparatus 200 displays the menu page (S1302). Then, on the menu page, the setting option is selected, and a first selection instruction is input into the display apparatus 200 via the menu page (S1303). Upon receiving the first selection instruction, the display apparatus 200 displays the setting page (S1304). A picture setting option is presented on the setting page, and the user selects the picture setting option on the setting page, and then inputs a second selection instruction into the display apparatus 200 (S1305). Upon receiving the second selection instruction, the display apparatus 200 displays a picture setting page (S1306). A setting option of the picture mode is configured on the picture setting page, and the user selects the setting option of the picture mode on the picture setting page, and then inputs a third selection instruction into the display apparatus 200 (S1307). After receiving the third selection instruction, the display apparatus 200 starts to obtain the video source information of the target video source, and determines all picture modes corresponding to the target video source according to the video source information (S1308).

Figure 14:
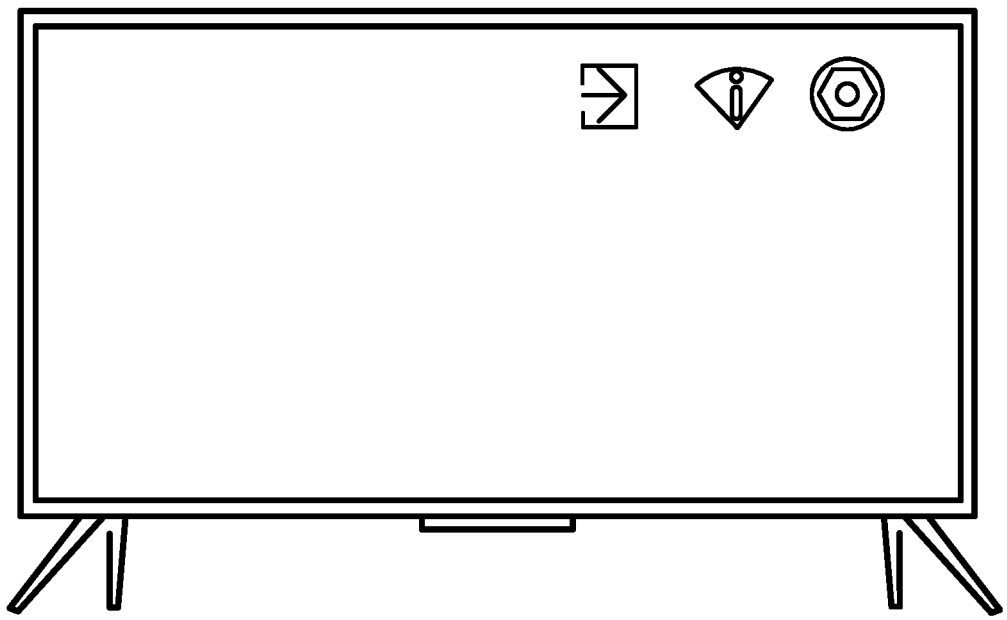
FIG. 14 is a schematic diagram of a menu page according to some embodiments.

FIG. 14 is a schematic diagram of a menu page according to some embodiments. As shown in FIG. 14, the setting option and other options may be displayed on the menu page. The user may invoke the menu page on the currently played display page by pressing a menu key on the control device 100 such as the remote controller.

Figure 15:
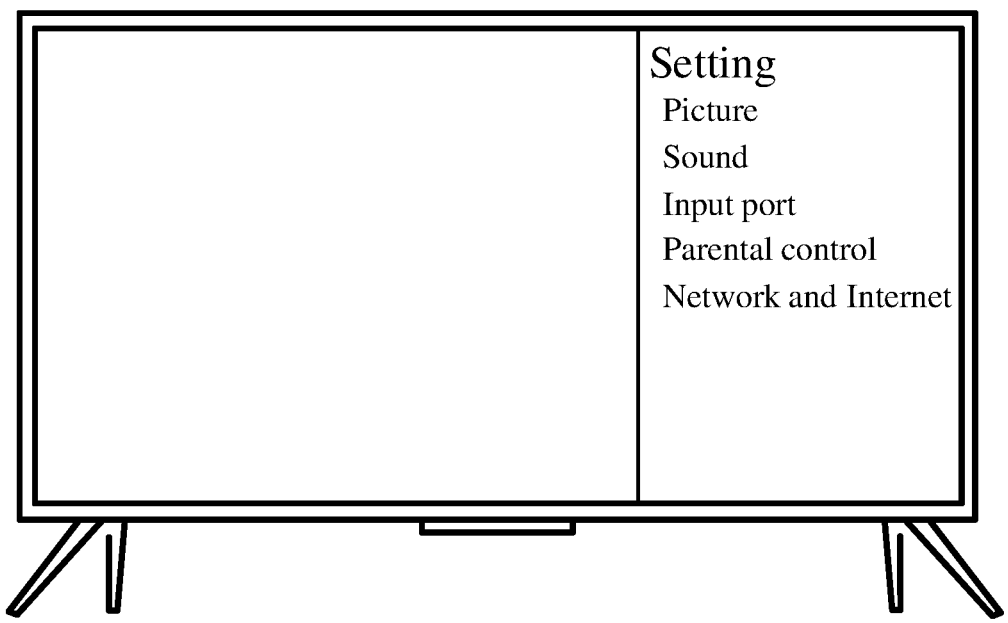
FIG. 15 is a schematic diagram of a setting page according to some embodiments.

FIG. 15 is a schematic diagram of a setting page according to some embodiments. After the user selects the setting option on the menu page as shown in FIG. 14, the display apparatus 200 may display the setting page as shown in FIG. 15. The setting page includes setting options such as an image, a sound, an input interface, parental control, a network and Internet.

Figure 16:
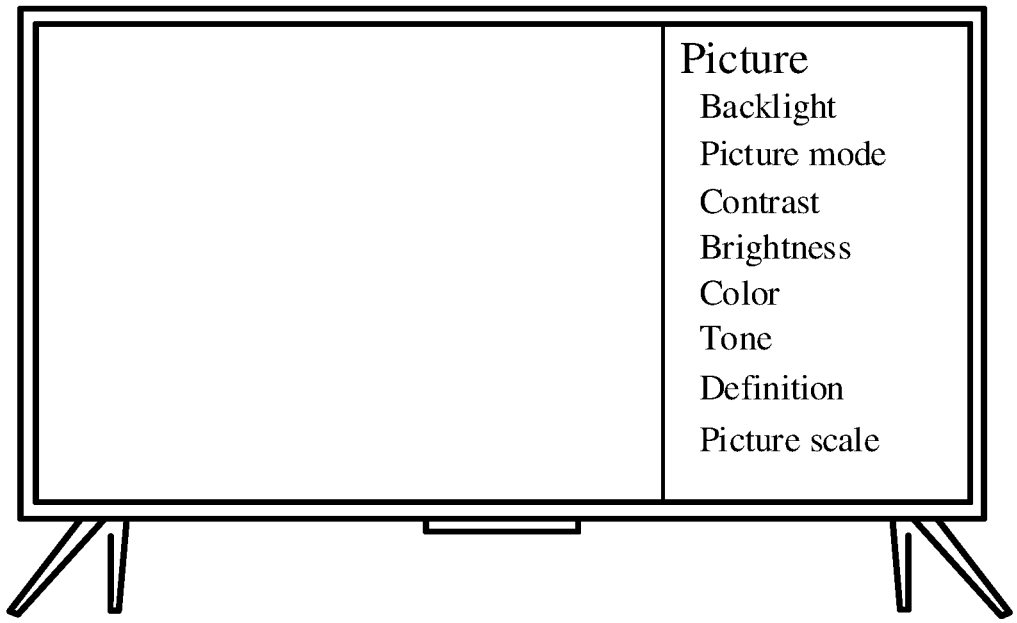
FIG. 16 is a schematic diagram of a picture setting page according to some embodiments.

FIG. 16 is a schematic diagram of a picture setting page according to some embodiments. After the user selects the setting option of the picture mode on the setting page as shown in FIG. 15, the display apparatus 200 may display the picture setting page as shown in FIG. 15. The picture setting page includes options such as backlight, a picture mode, contrast, brightness, color, tone, definition, an image scale, etc.

After the user selects the setting option of the picture mode on the picture setting page as shown in FIG. 16, the display apparatus 200 may obtain the video source information of the currently played target video source.

In the above process of obtaining the video source information, the processor 250 of the display apparatus 200 may be further configured to receive, while the target video source is displayed, the first selection instruction for selecting the setting option to the display apparatus 200 from the user; control a display 260 to display the setting page in response to the first selection instruction; control the display 260 to display the setting page in response to the second selection instruction for selecting a setting option of the picture mode on the setting page from the user; and obtain the video source information of the target video source in response to a third selection instruction for selecting a setting option of the picture mode on the picture setting page from the user.

In some embodiments, that display apparatus 200 may further provide the user with an automatic adaptation mode avoiding manual selection of the picture mode. When this automatic adaptation mode is activated for the display apparatus 200, the display apparatus 200 may display a newly added automatic mode in a picture mode list corresponding to a currently played target video source, and automatically select this mode Image quality parameters are also correspondingly set for the automatic mode. The display apparatus 200 directly adjusts image quality of the target video source according to the image quality parameters of the automatic mode.

Figure 17:
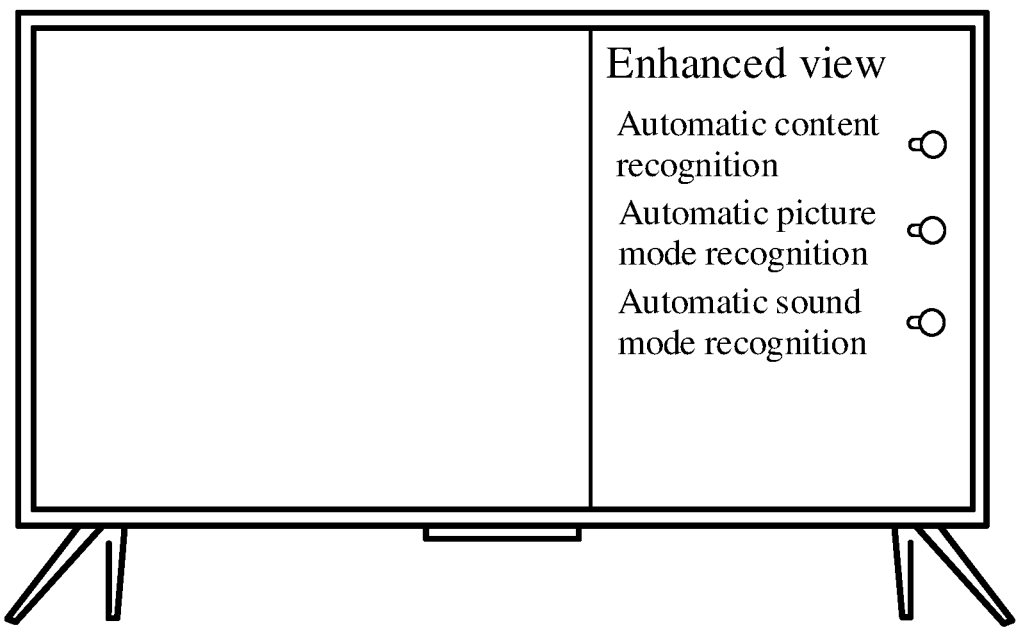
FIG. 17 is a schematic diagram of an enhanced viewing page according to some embodiments.

With reference to FIG. 17, Fig. a schematic diagram of an enhanced viewing page is shown according to some embodiments in FIG. 17. On the enhanced viewing page, an automatic content recognition option, an automatic picture mode adaptation option, an automatic sound mode adaptation mode, etc. may be displayed. The user may select whether to activate the automatic picture mode adaptation mode on the enhanced viewing page.

Figure 18:
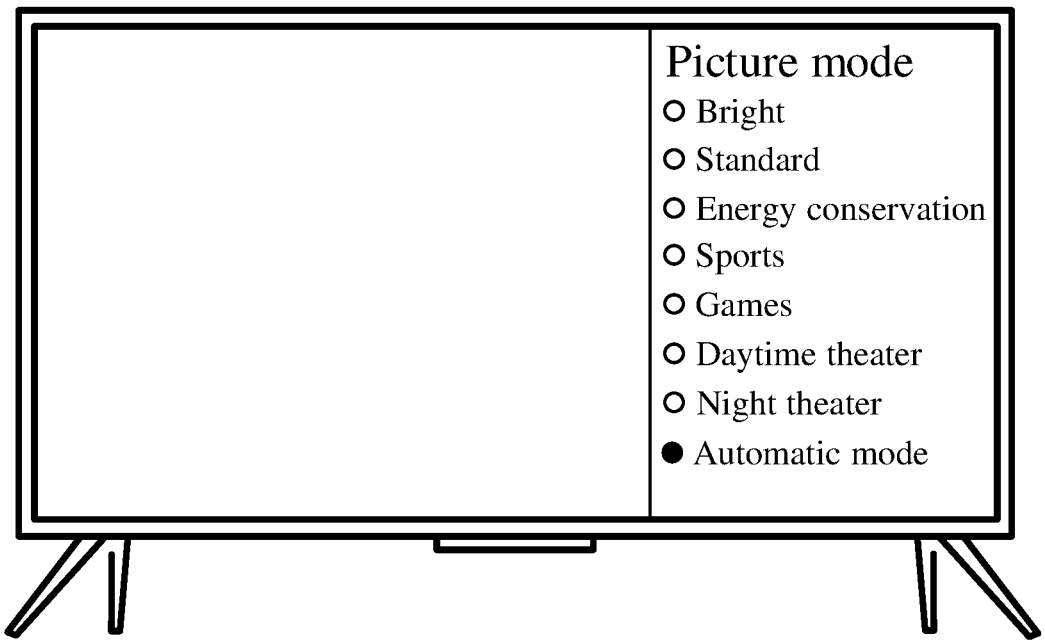
FIG. 18 is a schematic diagram of a picture mode list having an automatic mode according to some embodiments.

FIG. 18 is a schematic diagram of a picture mode list with an automatic mode according to some embodiments. When the user selects the automatic picture mode adaptation option on the enhanced viewing page as shown in FIG. 17, as shown in FIG. 18, a new automatic mode will be displayed on the picture mode list and is configured to have been selected by the display apparatus. In this case, the user does not need to select other picture modes manually, and the display apparatus 200 may directly adjust image quality of the currently played target video source according to image quality parameters corresponding to the current automatic mode.

In the above process of automatically adjusting the image quality by the display apparatus 200, the processor 250 of the display apparatus 200 may be further configured to control the display 260 to display the enhanced viewing page in response to a fourth selection instruction for selecting the enhanced viewing option on the setting page from the user; control the display 260 to display an automatic mode in the picture mode list in response to an activation instruction for selecting a picture mode adaptation option on the enhanced viewing page from the user, and control the automatic mode to be in a selected state; and adjust image quality of the target video source according to the image adjustment parameters corresponding to the automatic mode when the automatic mode in the picture mode list is selected.

In some embodiments, if the automatic picture mode adaptation option of the display apparatus 200 is activated, in a scenario where the user intends to adjust the picture mode, the display apparatus 200 further displays prompt information to remind the user that no manual selection is needed in the automatic mode at present.

Figure 19:
FIG. 19 is a schematic diagram of prompt information according to some embodiments.

With reference to FIG. 19, a schematic diagram of prompt information is shown according to some embodiments in FIG. 19. The prompt information is, for example, "automatically adapting and adjusting image quality is going now".

In some embodiments, even if the display apparatus 200 is in a state of automatically adapting and adjusting the image quality, if image quality adjusted according to the automatic mode may not satisfy requirements from the user, the user may manually select the target picture mode again. In this case, since the automatic mode is not used, the display apparatus 200 may close the picture mode adaptation mode on the enhanced viewing page and hide the automatic mode in the picture mode list corresponding to the currently played target video source.

In this process, the processor 250 of the display apparatus 200 may be further configured to detect whether a selection instruction for selecting a target picture mode is received while the automatic mode in the picture mode list is being selected, and hide an option of the automatic mode in the picture mode list, and close the picture mode adaptation option on the enhanced viewing page in response to receiving the selection instruction.

It may be seen from the above that the display apparatus 200 according to the embodiments of the present application can configure corresponding picture modes for a specific signal source and a specific type of video source in advance, and different picture modes correspond to different image adjustment parameters. When the user views the target video source on the display apparatus 200, the display apparatus 200 may display some corresponding picture modes for the user to choose according to video source information of the current target video source, instead of providing the same or several fixed picture modes for all videos. In this way, various picture modes on the display apparatus 200 may be more flexibly adapted to display requirements for different video sources or viewing requirements from the user, thereby improving display effect configuration.

The embodiments of the present application further provide a process method for a display apparatus. The method includes: presenting a user interface on a display of the display apparatus, where the user interface includes items which can be selected by a user, the items including a menu; and in response to a focus being on an option of the menu on the user interface, display a prompt content corresponding to the option on the user interface, where the prompt content includes an image and/or a text for describing a function of the option.

In some embodiments, displaying a prompt content corresponding to the option includes: in response to a focus on a current option on the user interface moving to a next option, displaying a prompt content corresponding to the next option on the user interface; where the prompt content is displayed in a prompt area for the menu, and the prompt area and the option of the menu are kept in relatively fixed positions.

In some embodiments, when the prompt content with image and text is displayed, the text is displayed on a lower edge of the image in a covering manner or the text and the image are displayed in a list form for the menu.

In some embodiments, when the prompt content merely including the text is displayed, the text is displayed in the prompt content between a menu name and the option, and an activated option is displayed in a highlighted manner on the user interface, where the menu name has a larger font than that of the option and the text.

The embodiments of the present application displays the function of the menu option intuitively by constructing the prompt content during browsing the menu option via a focus on the user interface; further, by constructing the image or the picture, the function of the menu option may be described with the video and the picture; further, by constructing the text, the function of the menu option may be described with the text; and further, by displaying the corresponding prompt content instantly when the focus is switched, the user may obtain the function of the menu option instantly, the specific adjustment effect and functional features of the menu option may be indicated conveniently, so as to select and set required parameter values, reduce operation burden and simplify the menu setting operation.

In the embodiments of the present application, the process method for the display apparatus further includes: obtaining video source information of a target video source currently played on the display apparatus, where the video source information includes signal source information of the target video source and type information of the target video source; determining all picture modes corresponding to the target video source according to the signal source information and the type information; and displaying all the picture modes in a picture mode list.

In some embodiments, the method may further include: while the target video source is displayed, receiving a first selection instruction for selecting a setting option of the picture mode from a user; in response to the first selection instruction, displaying a setting page on a display, where the setting page comprises a picture setting option; in response to a second selection instruction for selecting the picture setting option on the setting page, displaying an picture setting page on the display, wherein the picture setting page comprises a setting option of a picture mode; and in response to a third selection instruction of the setting option of the picture mode on the picture setting page, obtaining the video source information of the target video source.

In some embodiments, the method may further include: in response to a fourth selection instruction for selecting a target picture mode from the picture mode list, obtaining image adjustment parameters corresponding to the target picture mode; and adjusting image quality of the target video source according to the image adjustment parameters.

In some embodiments, the method may further include: in response to a fifth selection instruction for selecting an enhanced viewing option on the setting page, displaying an enhanced viewing page on the display; in response to an activation instruction for selecting a picture mode adaptation option on the enhanced viewing page, display an automatic mode in the picture mode list on the display, and causing the automatic mode in a selected state, where the automatic mode has corresponding image adjustment parameters.

In some embodiments, the method may further include: in response to the automatic mode in the picture mode list being selected, adjusting image quality of the target video source according to the image adjustment parameters corresponding to the automatic mode.

In some embodiments, the method may further include: while the automatic mode in the picture mode list is in selected state, detecting whether a sixth selection instruction for selecting a target picture mode is received; and in response to receiving the sixth selection instruction for selecting the target picture mode, hiding an option of the automatic mode in the picture mode list, and closing the picture mode adaptation option on the enhanced viewing page.

In some embodiments, the display apparatus may include processors such as a central processor (CPU), a video processor, an audio processor, a graphics processor (GPU), a storage medium such as a random access memory (RAM) or a read-only memory (ROM), and at least one of a first interface to a $n^{th}$ interface for input/output, and a communication bus.

According to some embodiments, a non-transitory computer-readable storage medium is provided, storing a computer program instruction, where when the computer program instruction is executed by a processor, the processor is caused to: present a user interface, where the user interface includes selectable items, the items including a menu; and display, when a focus is on an option of the menu in the user interface, a prompt content corresponding to the option on the user interface, where the prompt content includes an image and/or a text for introducing an option function.

For the convenience of explanation, the above description has been made in conjunction with specific implementation modes. However, the above exemplary discussion is not intended to be exhaustive or to limit the implementation mode to the specific forms disclosed above. Various modifications and variations can be made based on the above teachings. The above implementation modes have been chosen and described to better explain principles and practical applications, such that those skilled in the art can make better use of the implementation modes and different implementation mode variations suitable for specific use consideration.

What is claimed is:

1. A display apparatus, comprising:
   a display, configured for presenting one or more images and one or more user interfaces from a broadcast system or network;
   a communicating device, configured for communicating with the network;
   a remote controller, comprising a plurality of keys;
   a memory, configured to store instructions; and
   at least one processor, in connection with the display, the communicating device and the memory, and configured for executing the instructions to cause the display apparatus to perform:
   obtaining video source information from a target video source currently played by the display, wherein the video source information comprises signal source information of the target video source and type information of the target video source, and the type information of the target video source comprises at least one of: a Dolby type, a high-dynamic range (HDR) type, or a standard dynamic range (SDR) type;
   determining picture modes corresponding to the target video source according to the signal source information and the type information, wherein target video sources with different signal source information and different type information correspond to different picture modes;
   displaying the picture modes corresponding to the target video source in a picture mode list, wherein the at least one processor is further configured for executing the instructions to cause the display apparatus to perform:
      based on that the video source information indicates that the target video source is of the SDR type and an instruction for presenting a picture mode from a user is received, presenting one or more of a standard mode, an energy conservation mode, or a sport mode, of the SDR type, in the picture mode list;
   in response to a selection instruction for selecting a target picture mode from the picture mode list, obtaining image adjustment parameters corresponding to the target picture mode; and
   adjusting image quality of the target video source according to the image adjustment parameters.

2. The display apparatus according to claim 1, wherein the at least one processor is further configured for executing the instructions to cause the display apparatus to perform:
   while the display is playing the target video source, receiving a first selection instruction for selecting a setting option from a user;
   in response to the first selection instruction, causing the display to present a setting page;

in response to a second selection instruction for selecting a picture setting option on the setting page, causing the display to present a picture setting page; and in response to a third selection instruction for selecting a picture mode option on the picture setting page, obtaining the video source information of the target video source.

3. The display apparatus according to claim 2, wherein the at least one processor is further configured for executing the instructions to cause the display apparatus to perform:

in response to a fourth selection instruction for selecting an enhanced viewing option on the setting page, causing the display to present the enhanced viewing page; and in response to an activation instruction for a picture mode adaptation option on the enhanced viewing page, causing the display to present an automatic mode in the picture mode list, and controlling the automatic mode to be in a selected state, wherein the automatic mode has image adjustment parameters.

4. The display apparatus according to claim 3, wherein the at least one processor is further configured for executing the instructions to cause the display apparatus to perform:

in response to the automatic mode in the picture mode list being in the selected state, adjusting image quality of the target video source according to the image adjustment parameters corresponding to the automatic mode.

5. The display apparatus according to claim 3, wherein the at least one processor is further configured for executing the instructions to cause the display apparatus to perform:

while the automatic mode in the picture mode list is in the selected state, detecting whether a fifth selection instruction for selecting a target picture mode is received; and in response to receiving the fifth selection instruction, hiding an option of the automatic mode in the picture mode list, and closing the picture mode adaptation option on the enhanced viewing page.

6. The display apparatus according to claim 1, wherein the at least one processor is further configured for executing the instructions to cause the display apparatus to perform:

in response to the video source information indicating that the target video source is the video source of the Dolby type and receiving an instruction for presenting a picture mode from a user, obtaining one or more of a Dolby vision IQ mode, a Dolby view dark mode and a Dolby vision customization mode corresponding to the video source of the Dolby type, and presenting the one or more of the Dolby vision IQ mode, the Dolby view dark mode and the Dolby vision customization mode in the picture mode list.

7. The display apparatus according to claim 1, wherein the at least one processor is further configured for executing the instructions to cause the display apparatus to perform:

in response to the video source information indicating that the target video source is the video source of the HDR type and receiving an instruction for presenting a picture mode from a user, obtaining one or more of an HDR bright mode, an HDR standard mode and an HDR theater mode, and presenting the one or more of the HDR bright mode, the HDR standard mode and the HDR theater mode in the picture mode list.

8. The display apparatus according to claim 1, wherein the at least one processor is further configured for executing the instructions to cause the display apparatus to perform:

presenting one or more of a bright mode, a daytime theater mode, and a night theater mode, of the SDR type, in the picture mode list.

9. The display apparatus according to claim 1, wherein the at least one processor is further configured for executing the instructions to cause the display apparatus to perform:

presenting one or more of a bright mode, a game mode, a daytime theater mode, and a night theater mode, of the SDR type, in the picture mode list.

10. A process method for a display apparatus, comprising:

obtaining video source information from a target video source currently played by a display of the display apparatus, wherein the video source information comprises signal source information of the target video source and type information of the target video source, and the type information of the target video source comprises at least one of: a Dolby type, a high-dynamic range (HDR) type, or a standard dynamic range (SDR) type, wherein the display apparatus comprises the display for displaying an image from a broadcast system or network and a remote controller with a plurality of keys;

determining picture modes corresponding to the target video source according to the signal source information and the type information, wherein target video sources with different signal source information and different type information correspond to different picture modes;

displaying the picture modes corresponding to the target video source in a picture mode list, wherein based on that the video source information indicates that the target video source is the video source of the SDR type and an instruction for presenting a picture mode from a user is received, the method further comprises presenting one or more of a standard mode, an energy conservation mode, or a sport mode, of the SDR type, in the picture mode list;

in response to a selection instruction for selecting a target picture mode from the picture mode list, obtaining image adjustment parameters corresponding to the target picture mode; and adjusting image quality of the target video source according to the image adjustment parameters.

11. The process method according to claim 10, further comprising:

while the display is playing the target video source, receiving a first selection instruction for selecting a setting option from a user;

in response to the first selection instruction, causing the display to present a setting page;

in response to a second selection instruction for selecting a picture setting option on the setting page, causing the display to present a picture setting page; and in response to a third selection instruction for selecting a picture mode option on the picture setting page, obtaining the video source information of the target video source.

12. The process method according to claim 11, further comprising:

in response to a fourth selection instruction for selecting an enhanced viewing option on the setting page, causing the display to present the enhanced viewing page; and in response to an activation instruction for a picture mode adaptation option on the enhanced viewing page, causing the display to present an automatic mode in the picture mode list, and controlling the automatic mode to be in a selected state, wherein the automatic mode has image adjustment parameters.

13. The process method according to claim 12, further comprising:

in response to the automatic mode in the picture mode list being in the selected state, adjusting image quality of the target video source according to the image adjustment parameters corresponding to the automatic mode.

14. The process method according to claim 12, further comprising:

while the automatic mode in the picture mode list is in the selected state, detecting whether a fifth selection instruction for selecting a target picture mode is received; and in response to receiving the fifth selection instruction, hiding an option of the automatic mode in the picture mode list, and closing the picture mode adaptation option on the enhanced viewing page.

15. The process method according to claim 10, further comprising:

in response to the video source information indicating that the target video source is the video source of the Dolby type and receiving an instruction for presenting a picture mode from a user, obtaining one or more of a Dolby vision IQ mode, a Dolby view dark mode and a Dolby vision customization mode corresponding to the video source of the Dolby type, and presenting the one or more of the Dolby vision IQ mode, the Dolby view dark mode and the Dolby vision customization mode in the picture mode list.

16. The process method according to claim 10, further comprising:

in response to the video source information indicating that the target video source is the video source of the HDR type and receiving an instruction for presenting a picture mode from a user, obtaining one or more of an HDR bright mode, an HDR standard mode and an HDR theater mode, and presenting the one or more of the HDR bright mode, the HDR standard mode and the HDR theater mode in the picture mode list.

17. The process method according to claim 10, further comprising:

presenting one or more of a bright mode, a daytime theater mode, and a night theater mode, of the SDR type, in the picture mode list.

18. The process method according to claim 10, further comprising:

presenting one or more of a bright mode, a game mode, a daytime theater mode, and a night theater mode, of the SDR type, in the picture mode list.

* * * * *